US009432621B2

(12) United States Patent
Thapliyal et al.

(10) Patent No.: US 9,432,621 B2
(45) Date of Patent: Aug. 30, 2016

(54) TECHNIQUES FOR INTERFACING A USER TO AN ONLINE MEETING

(71) Applicant: Citrix Systems, Inc., Fort Lauderdale, FL (US)

(72) Inventors: Ashish V. Thapliyal, Santa Barbara, CA (US); Florian Winterstein, Rolling Hills Est., CA (US)

(73) Assignee: Citrix Systems, Inc., Fort Lauderdale, FL (US)

(*) Notice: Subject to any disclaimer, the term of this patent is extended or adjusted under 35 U.S.C. 154(b) by 136 days.

(21) Appl. No.: 14/184,041

(22) Filed: Feb. 19, 2014

(65) Prior Publication Data
US 2015/0237303 A1 Aug. 20, 2015

(51) Int. Cl.
*H04N 7/14* (2006.01)
*H04N 7/15* (2006.01)
*G11B 27/034* (2006.01)
*H04L 12/58* (2006.01)
*H04L 12/18* (2006.01)
(Continued)

(52) U.S. Cl.
CPC .............. *H04N 7/15* (2013.01); *G11B 27/034* (2013.01); *H04L 12/1813* (2013.01); *H04L 12/1827* (2013.01); *H04L 51/04* (2013.01); *H04N 5/23219* (2013.01); *H04N 5/247* (2013.01); *H04N 7/147* (2013.01)

(58) Field of Classification Search
CPC ........................................................ H04N 7/14
USPC ................................ 348/14.03, 14.12, 14.01
See application file for complete search history.

(56) References Cited

U.S. PATENT DOCUMENTS

| 2004/0201710 A1 | 10/2004 | Uchihashi et al. |
| 2006/0251382 A1 | 11/2006 | Vronay et al. |
| 2010/0080084 A1* | 4/2010 | Chen ................ G01S 11/14 367/118 |

(Continued)

FOREIGN PATENT DOCUMENTS

| EP | 2672704 A1 | 12/2013 |
| WO | 03030535 A1 | 4/2003 |
| WO | 2013066290 A1 | 5/2013 |

OTHER PUBLICATIONS

International Search Report and Written Opinion of the International Searching Authority, International Application No. PCT/US2015/015347, International Filing Date Feb. 11, 2015, Applicant Citrix Systems. Inc., 12 pages.

(Continued)

*Primary Examiner* — Olisa Anwah
(74) *Attorney, Agent, or Firm* — BainwoodHuang

(57) ABSTRACT

A technique is directed to interfacing a user to an online meeting. The technique includes performing an evaluation operation on a set of input/output (I/O) devices available for use by the user during the online meeting, each I/O device of the set being constructed and arranged to perform a same I/O function. The evaluation operation assesses online meeting performance of each I/O device of the set. The technique further includes selecting an I/O device based on a result of the evaluation operation. The technique further includes involving the selected I/O device of the set in the online meeting and excluding a non-selected I/O device of the set from the online meeting. Accordingly, the best suited I/O device can automatically be selected to improve the user experience. In some arrangements, rather than automatically switching I/O devices, the user is automatically prompted with a recommended I/O device to use.

20 Claims, 6 Drawing Sheets

(51) Int. Cl.
 *H04N 5/232* (2006.01)
 *H04N 5/247* (2006.01)

(56) References Cited

U.S. PATENT DOCUMENTS

2010/0081487 A1* 4/2010 Chen .................. G10L 21/0208
 455/575.1
2010/0085416 A1 4/2010 Hegde et al.
2012/0320143 A1* 12/2012 Chu ........................ H04N 7/15
 348/14.08
2013/0136089 A1 5/2013 Gillett et al.
2013/0260834 A1* 10/2013 Ingalls .................. H04M 1/605
 455/566

OTHER PUBLICATIONS

Martin Wolf et al., "On the Potential of Channel Selection for Recognition of Reverberated Speech with Multiple Microphones", TALP Research Center, Department of Signal Theory and Communications, Universitat Politecnica de Catalunya, Barcelona, Spain, Interspeech 2010, 4 pages.

* cited by examiner

| Manufacturer 182(1) | Model Number 182(2) | Description 182(3) (e.g., Details/Features/etc.) | Rank 182(4) |
|---|---|---|---|
| Manufacturer A | AAA-123 | Feature A1, Feature A2, Feature A3, … | 1 |
| Manufacturer A | AAA-456 | Feature A4, Feature A5, Feature A6, … | 2 |
| Manufacturer B | B78 | Feature B7, Feature B8 | 3 |
| Manufacturer C | 001122 | Feature C1, Feature X, Feature Y, … | 4 |
| Manufacturer A | AAA-789 | Feature A7, Feature A8, Feature A9, … | 5 |
| ... | ... | ... | ... |

TECHNIQUES FOR INTERFACING A USER TO AN ONLINE MEETING

BACKGROUND

During a conventional web conference, conference participants connect their participant devices to a web conference server over a computer network. Examples of suitable participant devices include desktop computers, laptop computers, tablets, and smart phones.

The participant devices provide video signals (e.g., to display participant faces) and audio signals (e.g., to carry participant voices) to the web conference server. The web conference server then shares the video signals among the participant devices. Additionally, the web conference server forms an aggregate audio signal from the audio signals, and shares the aggregate audio signal among the participant devices. As a result, the conference participants are able to view each other, as well as ask questions and inject comments to form a collaborative conference exchange even though the conference participants may be distributed among remote locations.

SUMMARY

In the above-described conventional web conference, there may be deficiencies which provide sub-optimal user experiences. For example, suppose that a conference participant connects a laptop computer to a web conference, and that the laptop computer is equipped with a display webcam (i.e., a camera integrated within the laptop's display), as well as a separate external webcam (e.g., a peripheral which attaches via a USB port). In such a situation, the local web conference software (or web client) may select input from the external webcam over the display webcam even when the participant is sitting directly in front of the laptop's display.

The conference participant may be heavily involved in the web conference discussion and may not even notice that the external webcam provides a sub-optimal view. However, if the conference participant does take notice and wishes to improve the view by using the display webcam instead, the conference participant must manually switch the web client to use the input from the display webcam rather than the external webcam. Moreover, if the conference participant moves or changes orientation during the web conference so that the external webcam is now better suited to provide the view, the conference participant must again manually switch the web client from the display webcam back to the external webcam.

As another example, suppose that a conference participant connects a computer to a web conference, and that the computer is equipped with multiple microphones and speakers. Along these lines, the participant may have a microphone and a speaker which are built-in to the computer, as well as a high quality external microphone/speaker peripheral or other communications device which is equipped with echo cancellation technology. In this situation, the web client may select the built-in microphone and speaker over the high quality external microphone/speaker peripheral (perhaps due to these built-ins being set as the default microphone and speaker by the computer's operating system). As a result, the choice of the microphone and speaker during the web conference may be sub-optimal, and the participant must manually switch the web client to use the high quality external microphone/speaker peripheral over the built-in microphone and speaker.

Other situations may exist in which a web conference accessory that is currently being used during a web conference is not the best. For example, if there are multiple microphones available to a participant, it is difficult for the participant to know which microphone is the best one to use. If the microphone is situation is poor, the participant may not know until others ask the participant to speak up.

Furthermore, even if the best suited web conference accessory is selected at the beginning of the web conference, the conditions may change so that the best suited web conference accessory changes during the course of the web conference. Along these lines, participants may move around (e.g., change seating position, leave or enter a conference room, etc.) thus changing which web conference accessory is best suited at a particular time. Additionally, changes may occur in the participants' environments which make the initial accessories less suitable (e.g., changes in lighting, changes in background noise, etc.).

In contrast to the above-described conventional web conference which requires a participant of the web conference to manually switch a poorly suited web conference accessory to a better suited web conference accessory, improved techniques are directed to automatically selecting the best suited I/O device (e.g., a webcam, a microphone, a speaker, etc.) for a user during an online meeting. In particular, processing circuitry performs an evaluation operation on a set of I/O devices to determine which I/O device is currently best suited for the user. The processing circuitry then selects the I/O device that is currently best suited based on a result of the evaluation operation and involves that I/O device in the online meeting. Other I/O devices of the set which perform the same function are not included in the online meeting. Moreover, at a subsequent time (e.g., periodically, after a new I/O device is connected/discovered, etc.), the processing circuitry can automatically re-perform the evaluation operation and perhaps select the new I/O device to involve in the online meeting. Accordingly, if meeting conditions change (e.g., the user may have moved, other users may have joined or left), the processing circuitry can adapt so that the best suited I/O device is used during the course of the online meeting. Such operation can be performed by the processing circuitry in an automated manner (and or perhaps automatically prompt the user for a possible change) to minimize the burden on the user.

One embodiment is directed to a method of interfacing a user to an online meeting. The method includes performing, by processing circuitry, an evaluation operation on a set of input/output (I/O) devices available for use by the user during the online meeting, each I/O device of the set being constructed and arranged to perform a same I/O function. The evaluation operation assesses online meeting performance of each I/O device of the set. The method further includes selecting, by the processing circuitry, an I/O device of the set based on a result of the evaluation operation. The method further includes, after the I/O device is selected, performing, by the processing circuitry, a user interface operation to interface the user to the online meeting, the user interface operation one of:

(i) involving the selected I/O device of the set in the online meeting and excluding a non-selected I/O device of the set from the online meeting to enable the user to participate in the online meeting via the selected I/O device of the set and not via the non-selected I/O device of the set, and (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set.

In some arrangements, multiple I/O devices constructed and arranged to perform the same I/O function are selected while one or more other I/O devices are not selected. For example, the processing circuitry may select multiple microphones and blend their inputs.

In some arrangements, performing the evaluation operation includes evaluating the set of I/O devices based on a set of quality criteria to determine which I/O device of the set provides superior online meeting performance.

In some arrangements, the set of I/O devices includes a first I/O device and a second I/O device. In these arrangements, evaluating the set of I/O devices includes applying the set of quality criteria to determine that the first I/O device provides superior online meeting performance over the second I/O device when performing the same I/O function. Here, selecting the I/O device of the set based on the result of the evaluation operation includes, upon completion of the evaluation operation, choosing the first I/O device over the second I/O device based on application of the set of quality criteria.

In some arrangements, the first I/O device is a first video camera, and the second I/O device is a second video camera. In these arrangements, performing the user interface operation includes sharing a video signal from the first video camera with other participants of the online meeting while not sharing any video signal from the second video camera with the other participants of the online meeting.

In some arrangements, applying the set of quality criteria includes (i) ascertaining that the first video camera provides a larger facial view of the user than the second video camera, and (ii) outputting, as the result of the evaluation operation, an indication that the first video camera provides the larger facial view of the user.

In some arrangements, applying the set of quality criteria includes (i) ascertaining that the first video camera is closer to a face of the user than the second video camera, and (ii) outputting, as the result of the evaluation operation, an indication that the first video camera is closer to the face of the user. Such arrangements may involve use of a depth sensing camera or additional depth sensing equipment.

In some arrangements, applying the set of quality criteria includes (i) comparing a signal to noise ratio provided by the first video camera with a signal to noise ratio provided by the second video camera, and (ii) outputting, as the result of the evaluation operation, an indication that the first video camera provides a better signal to noise ratio.

In some arrangements, applying the set of quality criteria includes (i) comparing a video quality provided by the first video camera with a video quality provided by the second video camera, and (ii) outputting, as the result of the evaluation operation, an indication that the first video camera provides a better video quality.

It should be understood that such operation can be based on face detection or sensing, e.g., which camera provides the largest view of the user's face, which camera is aimed towards the user's face rather than the side of the user's head, etc. Additionally, such operation can be based on camera and environment aspects, e.g., camera resolution, picture quality, lighting, contrast, color, sharpness/focus, frame rate, brightness, scoring based on combinations of criteria, and so on.

In some arrangements, applying the set of quality criteria includes (i) accessing a video camera database which ranks video cameras in a preferred video camera order, and (ii) outputting, as the result of the evaluation operation, an indication that the first video camera is ranked higher than the second video camera in the video camera database.

In some arrangements, the first I/O device is a first microphone, and the second I/O device is a second microphone. In these arrangements, performing the user interface operation includes sharing an audio signal from the first microphone with other participants of the online meeting while not sharing any audio signal from the second microphone with the other participants of the online meeting. In some arrangements, the audio signal from the first microphone may still be blended with the input from another microphone.

In some arrangements, applying the set of quality criteria includes (i) generating a first audio quality score based on a first audio signal from the first microphone, (ii) generating a second audio quality score based on a second audio signal from the second microphone, and (iii) outputting, as the result of the evaluation operation, an indication that the first audio quality score is higher than the second audio quality score.

It should be understood that such operation can be based on voice quality sampling, e.g., which microphone provides clearest voice, which microphone participates in echo cancellation if any, scoring based on combinations of criteria, etc. Other audio source quality criteria include signal to noise ratio (SNR), volume level, noise, fidelity/frequency range, echo, and so on.

In some arrangements, applying the set of quality criteria includes (i) accessing a microphone database which ranks microphones in a preferred microphone order, and (ii) outputting, as the result of the evaluation operation, an indication that the first microphone is ranked higher than the second microphone in the microphone database.

In some arrangements, applying the set of quality criteria includes identifying that (i) the first microphone resides in a communications device and (ii) a speaker of the communications device is in operation to output audio of the online meeting. In these arrangements, applying the set of quality criteria further includes outputting, as the result of the evaluation operation, an indication that the first microphone is preferred over the second microphone for use in the online meeting to enable use of echo cancellation by the communications device.

In some arrangements, the first I/O device is a first speaker, and the second I/O device is a second speaker. In these arrangements, performing the user interface operation includes outputting an audio signal of the online meeting from the first microphone while not outputting the audio signal of the online meeting from the second microphone.

In some arrangements, the method further includes, after a predefined amount of time has passed since the selected I/O device was selected, automatically re-evaluating the set of I/O devices during the online meeting, and automatically selecting a different I/O device in place of the selected I/O in response to re-evaluation of the set of I/O devices. Accordingly, at a subsequent time (e.g., periodically), the processing circuitry can automatically re-perform the evaluation operation and perhaps select the new I/O device to involve in the online meeting. As a result, if meeting conditions change (e.g., the user may have moved, other users may have joined or left), the processing circuitry is able to adapt so that the best suited I/O device is still used during the course of the online meeting. Such operation can be performed by the processing circuitry in an automated manner (and perhaps simply prompting the user in certain situations) to minimize the burden on the user.

In some arrangements, the method further includes, after involvement of the selected I/O device in the online meeting, discovering that a new I/O device has been added to the set of I/O devices and, in response to discovery of the new I/O device, automatically re-evaluating the set of I/O devices during the online meeting, and automatically selecting a new (or different) I/O device in place of the selected I/O in response to re-evaluation of the set of I/O devices. Thus, activities such as new hardware discovery, etc. can trigger the processing circuitry to re-evaluate and possibly switch I/O devices so that the best suited I/O device is continuously used in the online meeting.

In some arrangements, involving the selected I/O device of the set in the online meeting and excluding a non-selected I/O device of the set from the online meeting includes, when a new I/O device is selected, automatically switching to the new I/O device and rendering a notification to the user indicating that the processing circuitry has switched to the new I/O device. Accordingly, switching I/O devices occurs automatically but the user is still made aware of the switch.

In some arrangements, prompting the user to involve the selected I/O device of the set in the online meeting and exclude a non-selected I/O device of the set from the online meeting includes, when a new I/O device is selected, rendering a visual prompt to the user which identifies the new I/O device as a best suited I/O device for the online meeting and prompts the user to switch to the new I/O device. Accordingly, the user is able to control whether any I/O device switching takes place.

Another embodiment is directed to an electronic apparatus which includes a communications interface to connect to an online meeting, memory, and control circuitry coupled to the communications interface and the memory. The memory stores instructions which, when carried out by the control circuitry, cause the control circuitry to:

(A) perform an evaluation operation on a set of input/output (I/O) devices available for use by a user during the online meeting, each I/O device of the set being constructed and arranged to perform a same I/O function, the evaluation operation assessing online meeting performance of each I/O device of the set, (B) select an I/O device of the set based on a result of the evaluation operation, and (C) perform a user interface operation to interface the user to the online meeting, the user interface operation one of:

(i) involving the selected I/O device of the set in the online meeting and excluding a non-selected I/O device of the set from the online meeting to enable the user to participate in the online meeting via the selected I/O device of the set and not via the non-selected I/O device of the set, and (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set.

Another embodiment is directed to a computer program product having a non-transitory computer readable medium which stores a set of instructions to interface a user to an online meeting. The set of instructions, when carried out by computerized circuitry, causes the computerized circuitry to perform a method of:

(A) performing an evaluation operation on a set of input/output (I/O) devices available for use by the user during the online meeting, each I/O device of the set being constructed and arranged to perform a same I/O function, the evaluation operation assessing online meeting performance of each I/O device of the set;

(B) selecting an I/O device of the set based on a result of the evaluation operation; and (C) after the I/O device is selected, performing a user interface operation to interface the user to the online meeting, the user interface operation one of:

(i) involving the selected I/O device of the set in the online meeting and excluding a non-selected I/O device of the set from the online meeting to enable the user to participate in the online meeting via the selected I/O device of the set and not via the non-selected I/O device of the set, and (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set.

It should be understood that, in the cloud context, the computerized circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, virtualization, etc.

Other embodiments are directed to electronic systems and apparatus, processing circuits, computer program products, and so on. Some embodiments are directed to various methods, electronic components and circuitry which are involved in selecting the best suited I/O device for a user for an online meeting.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 5 is an example I/O device database which can be used when identifying a best suited I/O device for an online meeting.

DETAILED DESCRIPTION

An improved technique is directed to automatically selecting the best suited input/output (I/O) device (e.g., a webcam, a microphone, a speaker, etc.) for a user during an online meeting. Along these lines, processing circuitry performs an evaluation operation on a set of I/O devices to determine which I/O device is currently best suited for the user. The processing circuitry then selects the I/O device that is currently best suited based on a result of the evaluation operation and involves that I/O device in the online meeting. Input/output from other I/O devices of the set which perform the same function is not included in the online meeting.

Figure 1:
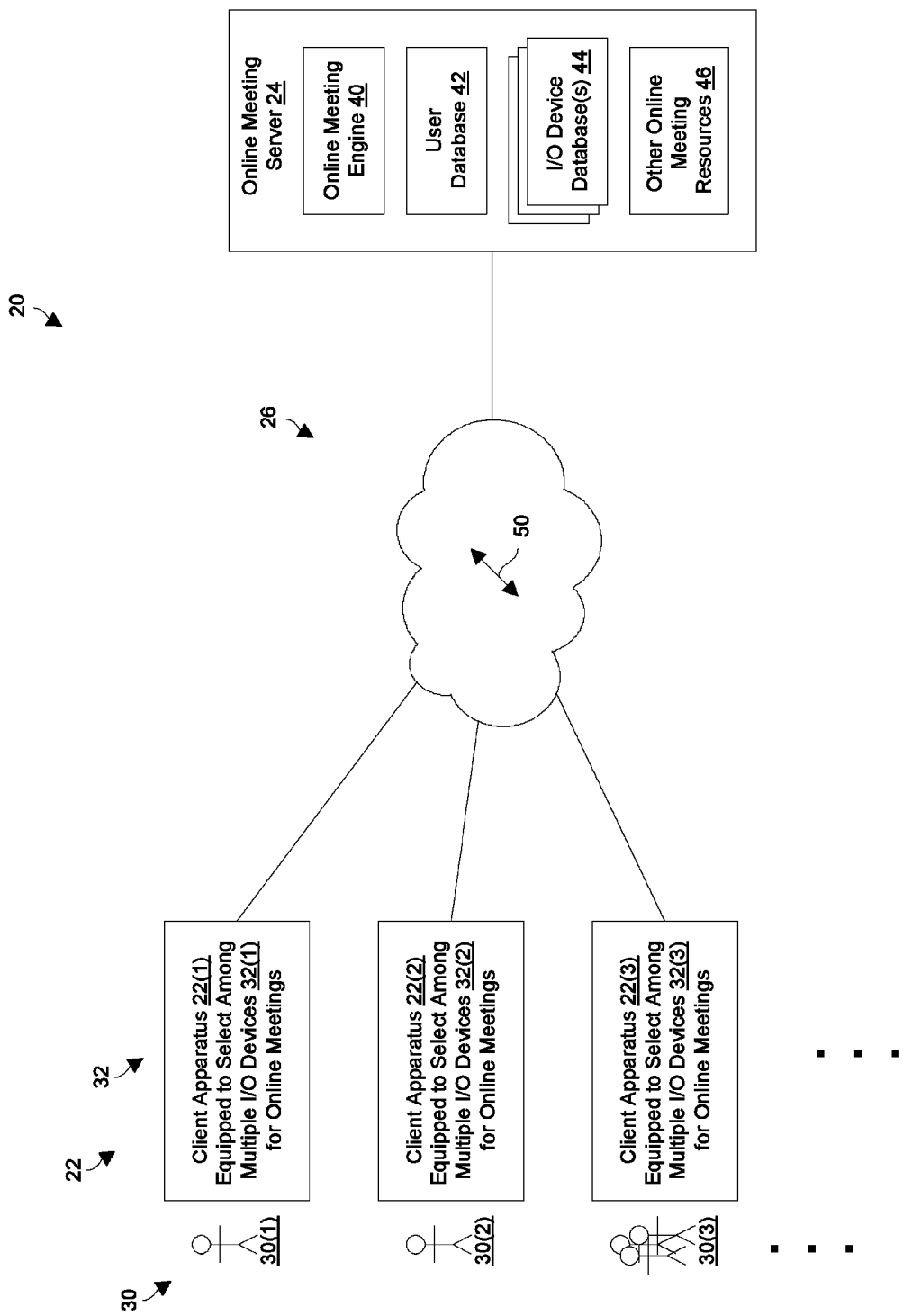
FIG. 1 is a block diagram of an electronic setting which is suitable for enabling automatic selection of best suited input/output (I/O) devices for users during online meetings.

FIG. 1 shows a computerized setting 20 which is suitable for automatic selection of best suited I/O devices for users during online meetings. The computerized setting 20 includes client apparatus 22(1), 22(2), 22(3), . . . (collectively, client apparatus 22), an online meeting server 24, and a communications medium 26.

Each client apparatus 22 is constructed and arranged to connect a respective set of users 30 (i.e., one or more users 30) to the online meeting server 24 for online meetings, and to automatically select among multiple I/O devices 32 (if present) so that the set of users 30 uses the best suited I/O device 32 during the online meetings. For example, the client apparatus 22(1) operates on behalf of a set of users 30(1), and can automatically select a particular I/O device 32 among the multiple I/O devices 32(1) for an online meeting. Similarly, the client apparatus 22(2) operates on behalf of a set of users 30(2), and can automatically select a particular I/O device 32 among multiple I/O devices 32(2). Likewise, the client apparatus 22(3) operates on behalf of a set of users 30(3), and can automatically select a particular I/O device 32 among multiple I/O devices 32(3), and so on.

The online meeting server 24 includes an online meeting engine 40, a user database 42, a set of I/O device databases 44, and other online meeting resources 46. The online meeting engine 40 is constructed and arranged to serve online meetings among the client apparatus 22. The user database 42 is constructed and arranged to manage user accounts, track online meetings, etc. The set of I/O device databases 44, which will be explained in further detail shortly, provides input to identification of the best suited I/O devices 32 for online meetings. The other online meeting resources 46 augment and enhance online meetings (e.g., deploys online meeting client applications to the client apparatus 22 as needed, ties in with other online collaboration tools such as shared folders, shared workspaces, and so on). It should be understood that some, or all, of the online meeting server 24 can be implemented in the cloud thus enabling greater distribution of services, scalability, load balancing, and so on.

The communications medium 26 is constructed and arranged to connect the various components of the computerized setting 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, cellular communications, plain old telephone service (POTS) communications, combinations thereof, etc.

During operation, the sets of users 30 are able to connect their respective client apparatus 22 to the online meeting server 24 to form online meetings. For each online meeting, the online meeting server 24 shares (i) video signals received from the participating client apparatus 22, and (ii) a composite audio signal that the online meeting engine 40 generates from individual audio signals obtained from the client apparatus 22. As a result, the sets of users 30 are able to view each other, as well as verbally interact for collaborative online meetings even though the users 30 may be separated by relatively large distances.

During such operation, each client apparatus 22 is equipped to automatically select the best suited I/O device 32 for the online meetings when multiple I/O devices 32 are available. For example, when there are multiple cameras locally available for use by a particular client apparatus 22, that client apparatus 22 is able to automatically select the best suited camera for use in an online meeting. Similarly, when there are multiple microphones locally available for use by a particular client apparatus 22, that client apparatus 22 is able to automatically select the best suited microphone for use in an online meeting, and so on.

In some arrangements, a client apparatus 22 is able to select multiple microphones and blend their audio inputs together to improve the user's experience. In these arrangements, audio input from one or more other poorly suited microphones can be omitted.

In some arrangements, a client apparatus 22 prompts a user for permission to switch I/O devices 32 rather than automatically switch. In these arrangements, the client apparatus 22 renders a visual prompt to the user which identifies a new I/O device 32 as a best suited I/O device for the online meeting and prompts the user for permission to switch to the new I/O device 32. Such a prompt serves as a convenient-provided recommendation to the user. Accordingly, the user can easily direct the client apparatus 22 to switch I/O devices 32 by simply accepting the prompt, or easily reject the prompt to stay with the current I/O device 32. Further details will now be provided with reference to FIG. 2.

Figure 2:
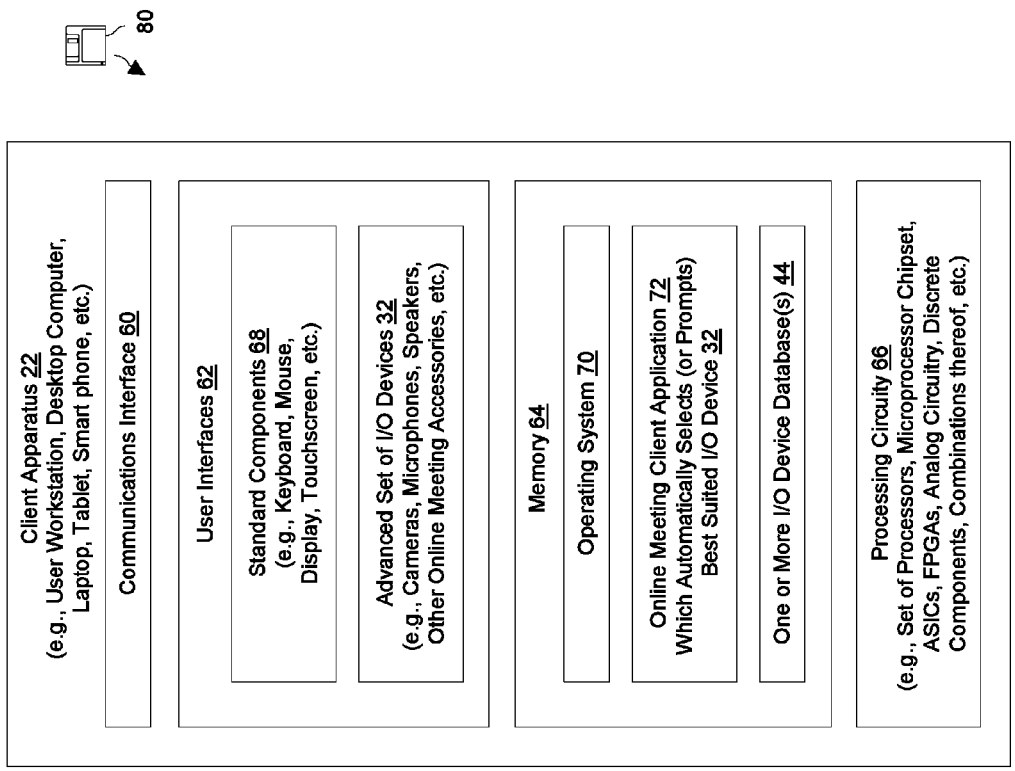
FIG. 2 is a block diagram of a client apparatus of the electronic setting of FIG. 1.

FIG. 2 is a block diagram of a client apparatus 22 which is equipped to select the best suited I/O device 32 among multiple available I/O devices 32 for use in an online meeting. The client apparatus 22 includes a communications interface 60, user interfaces 62, memory 64, and processing circuitry 66. The architecture and/or form factor of the client apparatus 22 may be that of a user workstation, a desktop computer, a laptop or notebook computer, a specialized conferencing system, a tablet device, a smart phone, combinations thereof, etc.

The communications interface 60 is constructed and arranged to connect the client apparatus 22 to the communications medium 30 (FIG. 1). Accordingly, the communications interface 60 enables the client apparatus 22 to communicate with the other components of the computerized setting 20 such as the online meeting server 24. Such communications may be line-based or wireless (i.e., IP-based, cellular, combinations thereof, and so on).

The user interfaces 62 are constructed and arranged to receive input from a set of users 30 and to provide output to the set of users 30. The user interfaces 62 include standard components 68 such as a standard keyboard, pointing device (e.g., mouse) and display. In the context of tablet or a smart phone, the standard components 68 can include other devices such as a miniature keyboard, a touch screen, and so on.

Additionally, the user interfaces 62 include an advanced set of I/O devices 32 (also see FIG. 1). Examples of suitable I/O devices 32 include one or more cameras, one or more microphones, one or more speakers, and perhaps other online meeting accessories.

The memory 64 is intended to represent both volatile storage (e.g., DRAM, SRAM, etc.) and non-volatile storage (e.g., flash memory, magnetic disk drives, etc.). The memory 64 stores a variety of software constructs including an operating system 70, an online meeting client application 72, and one or more I/O device databases 44.

The processing circuitry 66 is constructed and arranged to operate in accordance with the various software constructs stored in the memory 64. In particular, the processing circuitry 66, when executing the operating system 70, manages various resources of the client apparatus 22 (e.g., memory allocation, processor cycles, etc.). Additionally, the processing circuitry 66 executing the online meeting client application 72 forms control circuitry which connects users 30 of the client apparatus 22 to the online meeting server 24 to allow the users 30 to participate in an online meeting. Furthermore, such control circuitry is able to obtain copies of the I/O device databases 44 from the online meeting server 24 and access information in the I/O device databases 44 to smartly select particular I/O devices 32 for use in the online meeting.

It should be understood that the above-mentioned control circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software to the client apparatus 22. The computer program product 80 has a non-transitory and non-volatile computer readable medium which stores a set of instructions to control one or more operations of the client apparatus 22. Examples of suitable computer readable storage media include tangible articles of manufacture and apparatus which store instructions in a non-volatile manner such as CD-ROM, flash memory, disk memory, tape memory, and the like.

During operation, the control circuitry of the client apparatus 22 is able to select the best suited I/O device 32 when multiple I/O devices performing the same I/O function are available for use during an online meeting. For example, the client apparatus 22 may have access to multiple cameras. As another example, the client apparatus 22 may have access to multiple microphones, and so on.

To select the best suited I/O device 32, the control circuitry performs an evaluation operation and then chooses the I/O device 32 based on a result of the evaluation operation. The control circuitry then involves the chosen I/O device 32 in the online meeting, and excludes the other I/O devices 32 that perform the same function from the online meeting. Alternatively, the control circuitry prompts the user recommending that the user switch to the chosen I/O device 32 and the user is able to effectuate the switch with a simple reply to the prompt (e.g., clicking on an "accept" button).

Periodically and/or in response to detection of new I/O devices 32, the control circuitry is capable of re-performing the evaluation operation and choosing a different I/O device 32 as the best suited I/O device 32. Along these lines, a user 30 may move during the online meeting thus making a different camera the best suited camera for the online meeting. The same applies to other online meeting accessories such as microphones, speakers, etc.

In connection with periodic re-evaluation to continuously use the best suited I/O device 32, it should be understood that switching I/O devices 32 should be performed frequently enough so that it is useful and effective. However, switching should not be performed so frequently that it is distracting and unstable. Along these lines, a maximum frequency of once every few seconds works well in practice (e.g., every X seconds at most where X is three, five, 10, etc.). Further details will now be provided with reference to FIG. 3.

Figure 3:
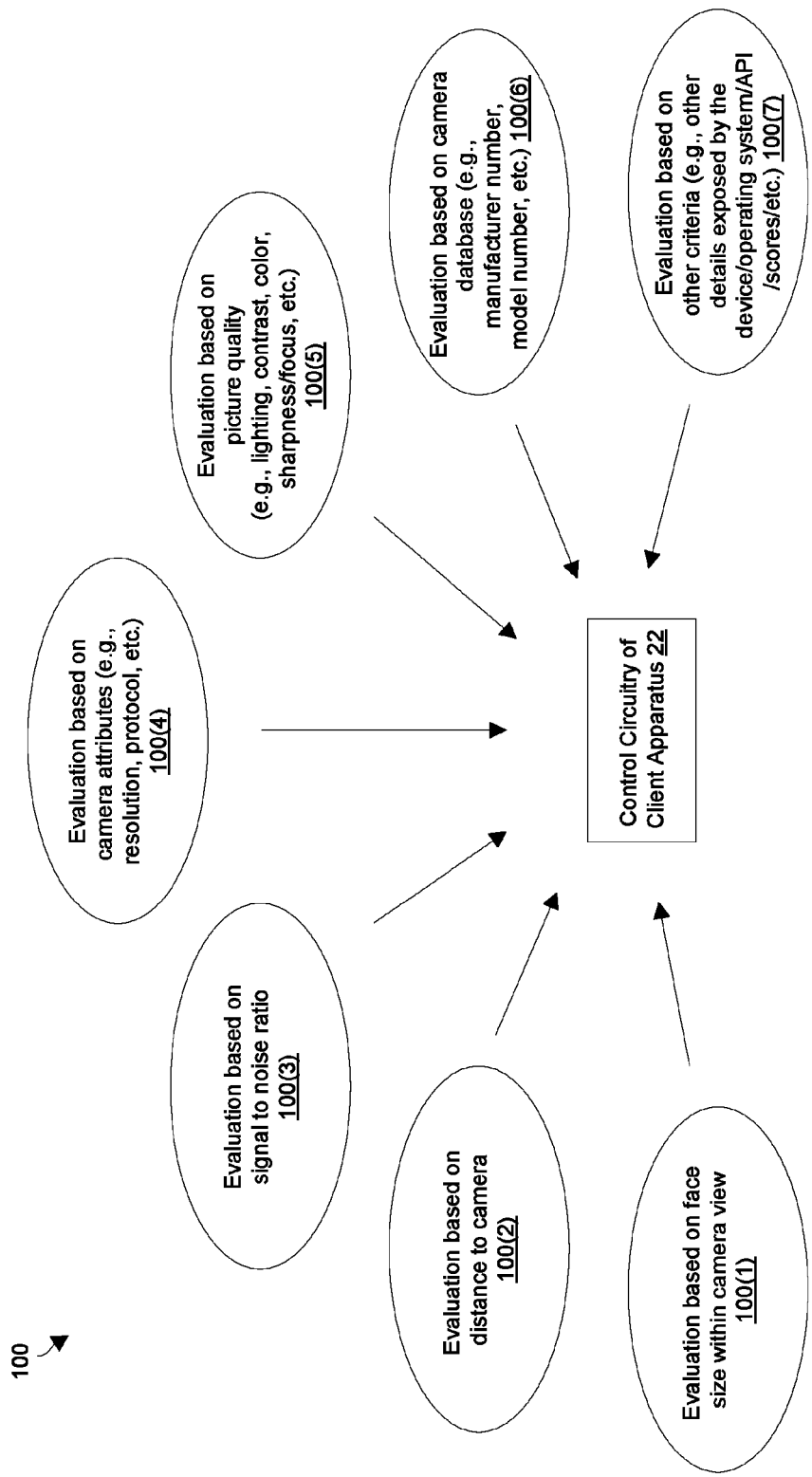
FIG. 3 is a diagram illustrating various evaluation techniques for identifying the best suited camera for a user during an online meeting.

FIG. 3 is a diagram illustrating various evaluation operation alternatives 100 for automatically identifying the best available camera during an online meeting. In some arrangements, a user 30 of the client apparatus 22 selects which alternative 100 is used by the client apparatus 22 (e.g., by entering a command into a GUI while the processing circuitry 66 executes the online meeting client application 72). In other arrangements, the online meeting server 24 controls which alternative 100 is used by the client apparatus 22 during the online meeting.

In the alternative 100(1), the control circuitry of the client apparatus 22 evaluates each camera based on a user's face size within the camera view of that camera. That is, the control circuitry samples a camera signal from each camera, and identifies the camera that provides the largest view of the user's face (or users' faces) as the best suited camera for the online meeting.

In another alternative 100(2), the control circuitry evaluates each camera based on distance to that camera. For example, the control circuitry can identify the camera that is closest to the user 30, or to the user's face, as the best suited camera. If there are multiple users 30 (e.g., see client apparatus 22(3) in FIG. 1), the control circuitry can identify the best suited camera based on the distance of the closest user 30, the farthest user 30, both, and so on.

In another alternative 100(3), the control circuitry evaluates each camera based on a signal to noise ratio of that camera. For example, the control circuitry can identify the camera with the highest signal to noise ratio as the best suited camera.

In another alternative 100(4), the control circuitry evaluates each camera based on camera attributes of that camera. For example, the control circuitry can identify the camera with the highest resolution, the camera that provides video using the best protocol, etc., as the best suited camera.

In another alternative 100(5), the control circuitry evaluates each camera based on picture quality of that camera. For example, rather than based on just resolution, the control circuitry can identify a particular camera as the best suited camera based on lighting, contrast, color, sharpness/focus, frame rate, brightness, other picture quality aspects, combinations thereof, and so on.

In another alternative 100(6), the control circuitry evaluates each camera based on a camera database 44 (also see I/O device databases 44 in FIGS. 1 and 2). Such a database can include entries for different cameras based on manufacturer, model number, etc. and rank the cameras in order of preference. In such an arrangement, the control circuitry can acquire a camera device ID (e.g., a device name, characteristics, etc.) via an API, and look up each available camera in the camera database 44. The highest ranked available camera is considered the best suited camera. One will appreciate that such a camera database 44 can be derived by a third-party entity which operates the online meeting server 24 (e.g., based on experience, based on testing, based on customer feedback, etc.), and initially stored at the online meeting server 24 (FIG. 1). Then, a copy of the camera database 44 can be distributed to each client apparatus 22 to enable local determination of the best suited camera (e.g., via periodic updates, in response to performing the evaluation operation, etc.).

In another alternative 100(7), the control circuitry evaluates each camera based on other criteria. Examples of other criteria include other details exposed by the camera device, the operating system, the camera API, etc. such as camera problems/faults/status, intermittent signals, error messages, generated scores based on multiple camera factors, and so on.

It should be understood that other alternatives 100 for identifying the best available camera are suitable for use as well. Furthermore, the alternatives 100 can be combined together so that camera identification is based on multiple factors.

In some arrangements, the control circuitry of the client apparatus 22 is configured to attempt a first alternative 100. If an effective result is obtained from the evaluation operation, the control circuitry uses that result to identify the best suited camera. However, if the result is inconclusive, the control circuitry applies a different alternative 100, and so on. The order of alternatives 100 can be dictated by a predefined list, a set of rules/policies, the user 30, etc.

For example, the control circuitry can be directed to automatically identify the best suited camera based on alternative 100(4) (i.e., identify the camera with the highest resolution). If there is a camera that has the highest resolution, the control circuitry identifies that camera as the best suited. However, if the control circuitry is unable to determine the resolution of each camera (perhaps multiple cameras have the same highest resolution, perhaps resolution data is unavailable, etc.), the control circuitry can apply the next alternative based on a set of rules such as alternative 100(6), and so on.

In other arrangements, evaluation operations of multiple alternatives 100 are performed, and score results of each alternative 100 are combined to provide respective aggregate scores for each available camera. The camera with the highest aggregate score can then be selected as the best suited camera. Further details will now be provided with reference to FIG. 4.

Figure 4:
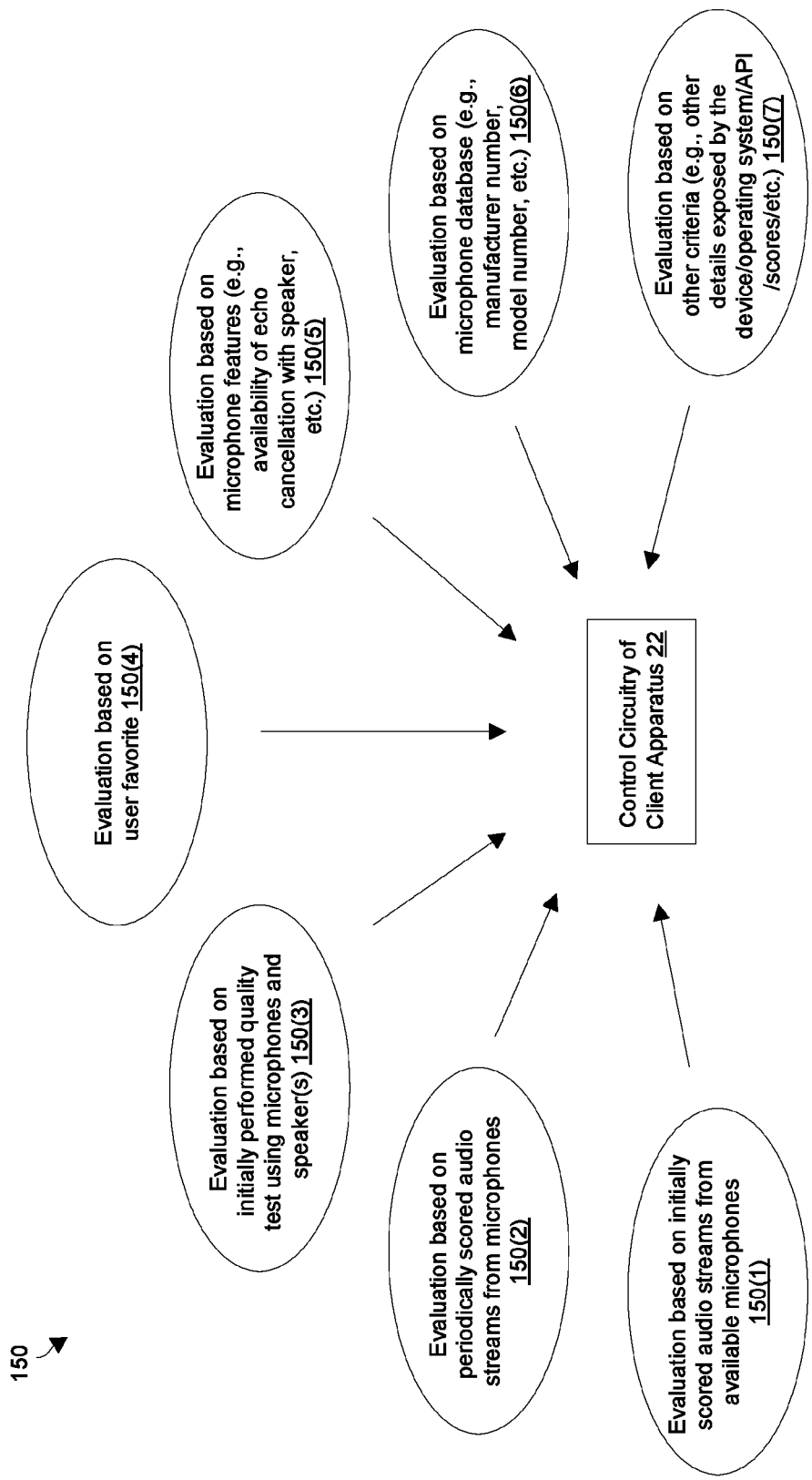
FIG. 4 is a diagram illustrating various evaluation techniques for identifying the best suited microphone for a user during an online meeting.

FIG. 4 is a diagram illustrating various evaluation operation alternatives 150 for automatically identifying the best available microphone during an online meeting. In some arrangements, a user 30 of the client apparatus 22 selects which alternative 150 is used by the client apparatus 22 (e.g., by entering a command into a GUI while the processing circuitry 66 executes the online meeting client application 72). In other arrangements, the online meeting server 24 controls which alternative 150 is used by the client apparatus 22.

In the alternative 150(1), the control circuitry of the client apparatus 22 evaluates each microphone based on an initially scored audio stream from the available microphones. Here, the control circuitry samples each microphone and identifies the microphone that provides the best voice quality score. Such scoring can be based on signal to noise ratio, noise, audio fidelity analysis, audio spectrum analysis, amount of echo, combinations thereof, and so on. The control circuitry considers the microphone with the highest score as the best suited microphone for the online meeting.

In another alternative 150(2), the control circuitry evaluates each microphone based on periodically computed audio stream scores from the available microphones. In the alternative 150(2), the process of alternative 150(1) is repeated so that each periodically computed audio stream score is based on a tally of multiple samples over time. Such a tally of scores can be maintained in the memory 64 and updated periodically (e.g., every 15 seconds, every 30 seconds, every minute, etc.). The control circuitry considers the microphone with the highest periodically computed audio stream score as the best suited microphone for the online meeting.

In another alternative 150(3), the control circuitry evaluates each microphone via an initially performed quality test. In this alternative 150(3), the control circuitry outputs an audio signal with a range of tones from a set of available speakers, and samples that audio signal on each microphone. The control circuitry then identifies the microphone with the best performance in terms of preserving the original audio signal as the best suited microphone. Instead, a user 30 can read a text or make other sounds, and the control circuitry can identify the best suited microphone based on the obtained audio response. Suitable audio quality criteria include signal to noise ratio (SNR), volume level, noise, fidelity/frequency range, echo, and the like.

In another alternative 150(4), the control circuitry queries the user 30 to identify the user's favorite microphone. Such operation is still initiated automatically thus alleviating the need for the user 30 to substantially navigate through menus and/or dialogue boxes of a GUI.

In another alternative 150(5), the control circuitry evaluates each microphone based on microphone features. Along these lines, certain microphones may be equipped with echo cancellation (e.g., a microphone/speaker set, a specialized communications device, etc.). Also, certain microphones may be omnidirectional, unidirectional, bidirectional, cardioid, etc.

In another alternative 150(6), the control circuitry evaluates each microphone based on a microphone database 44 (also see I/O device databases 44 in FIGS. 1 and 2). Such a database can include entries for different microphones based on manufacturer, model number, etc. and rank the microphones in order of preference. In such an arrangement, the control circuitry can acquire a microphone device ID (e.g., a device name or model number, characteristics, etc.) via an API, and look up each available microphone in the microphone database 44. The highest ranked available microphone is considered the best suited microphone. One will appreciate that such a microphone database 44 can derived by an entity which operates the online meeting server 24 (e.g., based on experience, based on testing, based on customer feedback, etc.), and initially stored at the online meeting server 24 (FIG. 1). Then, a copy of the microphone database 44 can be distributed to each client apparatus 22 to enable local determination of the best suited microphone (e.g., via periodic updates, in response to performing the evaluation operation, etc.).

In another alternative 150(7), the control circuitry evaluates each microphone based on other criteria. Examples of other criteria include other details exposed by the microphone device, the operating system, the microphone API, etc. such as microphone problems/faults/status, intermittent signals, error messages, generated scores based on multiple microphone factors, and so on.

It should be understood that other microphone alternatives 150 for identifying the best available microphone are suitable for use as well. Furthermore, the microphone alternatives 150 can be combined together so that microphone identification is based on multiple factors.

As with the camera alternatives 100, in some arrangements, the control circuitry of the client apparatus 22 is configured to attempt a first microphone alternative 150 to identify the best suited microphone. If the results are effective, the control circuitry uses the results to identify the best suited microphone. However, if the results are inconclusive, the control circuitry applies a different microphone alternative 150, and so on. The order of microphone alternatives 150 can be dictated by a predefined list, a set of rules/policies, the user 30, etc.

For example, the control circuitry can be directed to automatically identify the best suited microphone based on alternative 150(4) (i.e., identify the microphone via a quality test using microphones and at least one speaker). If there is a speaker that is able to provide an audio signal that is picked up by each microphone, the control circuitry can effectively identify a particular microphone as the best suited. However, if there is no speaker available for that task (e.g., the user 30 may use earphones, the speaker may be turned down too low, etc.), the control circuitry can apply the next alternative based on a set of rules such as alternative 150(6), and so on.

In other arrangements, evaluation operations of multiple alternatives 150 are performed, and results of each alternative 150 are combined to provide respective aggregate scores for each available microphone. The microphone with the highest aggregate score can then be selected as the best suited microphone.

It should be understood that evaluations similar to that described above for available cameras (e.g., see FIG. 3) and available microphones (e.g., see FIG. 3) can be performed to identify other online meeting accessories as well. For example, if the client apparatus 22 has multiple speakers, and the control circuitry is capable of automatically identifying which speaker is best suited for outputting a shared aggregate audio signal of the online meeting via alternatives similar to those described above for cameras and microphones.

Moreover, when a client apparatus 22 has multiple cameras, microphones, and/or speakers, etc. which are available for use during an online meeting, the client apparatus 22 can perform the evaluation on each different type of online meeting accessory. For example, the client apparatus 22 can perform evaluation on available cameras to select the best suited camera. Then, the client apparatus 22 can perform evaluation on available microphones to select the best suited microphone, and so on. In some arrangements, the evaluation operations share information to take into account the presence of hybrid devices (e.g., an audio subsystem which includes a microphone and a speaker, and which performs echo cancellation). Further details will now be provided with reference to FIG. 5.

FIG. 5 shows an example format for an I/O device database 44 (also see FIGS. 1 and 2). The I/O device database 44 includes entries 180(1), 180(2), 180(3), . . . (collectively, entries 180). Each entry 180 includes multiple fields 182 to hold I/O device information corresponding to a particular I/O device 32 (e.g., a particular camera, a particular microphone, a particular speaker, etc.). Along these lines, each entry 180 includes a manufacturer field 182(1) to hold an identifier of the manufacturer of the particular I/O device 32. Additionally, each entry 180 includes a model number field 180(2) to hold a model number of the particular I/O device 32. The combination of manufacturer and model number uniquely identifies each I/O device 32.

Furthermore, each entry 180 includes a description field 182(3) to hold a description of the particular I/O device 32 (e.g., data regarding certain features of the I/O device 32 such as resolution, capabilities, etc.). In the context of cameras, if the description field 182(3) indicates that a particular available camera has a certain camera resolution, has depth sensing capability, has light filtering capability, etc., the control circuitry can query the available camera to determine whether such features are currently in place or activated. Similarly, in the context of microphones, if the description field 182(3) indicates that a particular available microphone has a certain microphone feature, the control circuitry can query the available microphone to determine whether that feature is currently in place.

Moreover, each entry 180 includes a rank field 182(4) to hold a ranking of the particular I/O device 32 among the other I/O devices 32. For example, the entry 180(1) corresponds to the highest ranked I/O device 32, the entry 180(2) corresponds to the second highest ranked I/O device 32, and so on.

During operation, if the control circuitry of a client apparatus 22 applies an alternative which utilized an I/O device database 44, the control circuitry obtains the make and model of each available I/O device 32 (e.g., via an API), and then looks up that available I/O device 32 in the I/O device database 44 (FIG. 5). The I/O device 32 with the highest ranking is considered the best suited I/O device 32 for an online meeting.

In some arrangements, the I/O device database 44 is provided by the online meeting server 24 to the client apparatus 22 during an initial setup time (e.g., when provisioning the client apparatus 22 with the online meeting client application 72). In some arrangements, the I/O device database 44 is provided (or updated) periodically (e.g., before each online meeting begins, once a day, during startup of the client apparatus 22, etc.). Further details will now be provided with reference to FIG. 6.

Figure 6:
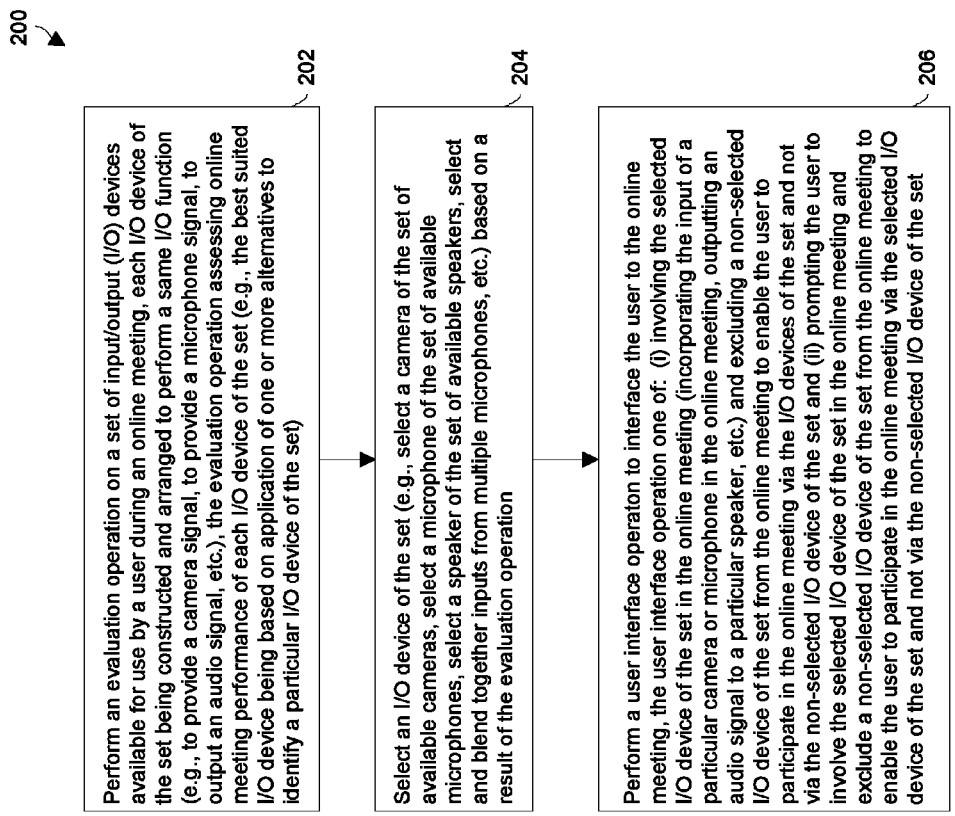
FIG. 6 is a flowchart of a procedure which is performed when selecting the best suited I/O device for an online meeting.

FIG. 6 is a flowchart of a procedure 200 which is performed by a client apparatus 22 when the client apparatus 22 has multiple I/O devices available to perform the same function in an online meeting (e.g., multiple cameras, multiple microphones, multiple speakers, etc.). At 202, the client apparatus 22 automatically performs an evaluation operation on a set of input/output (I/O) devices 32 available for use by a user (or users) 30 during the online meeting, the evaluation operation assessing online meeting performance of each I/O device of the set. Each I/O device 32 of the set is constructed and arranged to perform a same I/O function (e.g., video input, audio input, audio output, etc.).

Recall that FIG. 3 illustrated particular alternatives 100 for identifying the best suited camera. As described earlier, camera performance can be measured via a variety of criteria such as resolution, picture quality, user image quality, model ranking, combinations thereof, etc.

Likewise, FIG. 4 illustrated particular alternatives 150 for identifying the best suited microphone. As described earlier, microphone performance can be measured via a variety of criteria such as signal to noise ratio, fidelity analysis, model ranking, combinations thereof, and so on.

In 204, the client apparatus 22 selects an I/O device 32 of the set based on a result of the evaluation operation. Along these lines, the client apparatus 22 selects the currently best suited I/O device 32 (or multiple I/O devices 32) among the available I/O devices 32.

In 206, the client apparatus 22 performs a user interface operation to interface the user to the online meeting, the user interface operation one of:

(i) involving the selected I/O device of the set in the online meeting and excluding a non-selected I/O device of the set from the online meeting to enable the user to participate in the online meeting via the selected I/O device of the set and not via the non-selected I/O device of the set, and (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set.

Such operation enables the user 30 to participate in the online meeting via less than all of the I/O devices 32 of the set. For example, if the inputs from different cameras are available, the client apparatus 22 includes the input from the best suited camera in the online meeting, and does not use input from a poorly suited camera in the online meeting (although the inputs from all of the cameras can be periodically sampled, etc.).

It should be understood that the procedure 200 can be repeated for a different type of I/O device 32. For example, once the best suited camera is chosen and included in the online meeting, the client apparatus 22 can perform the procedure 200 to choose and include the best suited microphone in the online meeting, and so on.

Additionally, it should be understood that the procedure 200 can be re-performed many times during the online meeting and, if another I/O device 32 is determined to be the best suited I/O device 32 (due to a change in lighting conditions, due to a change in environmental noise conditions, due to a user 30 moving during the online meeting, etc.), the client apparatus 22 can change I/O devices 32 automatically (or prompt the user 30 to commit a proposed change). As a result, the client apparatus 32 enables users 30 to continuously use the best suited I/O devices 32 during online meetings.

As described above, improved techniques are directed to automatically selecting the best suited I/O device 32 (e.g., a webcam, a microphone, a speaker, etc.) for a user 30 during an online meeting. In particular, processing circuitry performs an evaluation operation on a set of I/O devices 32 to determine which I/O device 32 is currently best suited for the user 30. The processing circuitry then selects the I/O device 32 that is currently best suited based on a result of the evaluation operation and involves that I/O device 32 in the online meeting. Other I/O devices 32 of the set which perform the same function are not involved in the online meeting. Moreover, at a subsequent time (e.g., periodically, after a new I/O device 32 is connected/discovered, etc.), the processing circuitry can automatically re-perform the evaluation operation and perhaps select the new I/O device 32 to involve in the online meeting. Accordingly, if meeting conditions change (e.g., the user 30 may have moved, other users may have joined or left), the processing circuitry can adapt so that the best suited I/O device 32 is used during the course of the online meeting. Such operation can be performed by the processing circuitry in an automated manner (and perhaps automatically prompting the user 30 in certain situations) to minimize the burden on the user 30.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the computerized setting 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular communications, POTS-based communications, combinations thereof, and so on.

Additionally, it should be understood that the client apparatus 22 were described above by way of example as performing the evaluation operations and selecting the best suited I/O devices 32. In some arrangements, the online meeting server 24 performs such operations rather than the client apparatus 22.

Furthermore, it should be understood that cameras, microphones, and speakers were described above as suitable I/O devices 32 by way of example only. Other types of I/O accessories can be used as well such as touch screen I/O devices (e.g., tablets, smart phones, TVs, etc.), and so on. Such modifications and enhancements are intended to belong to various embodiments of the disclosure.

What is claimed is:

1. A method of interfacing a user to an online meeting, the method comprising:
    performing, by processing circuitry, an evaluation operation on a set of input/output (I/O) devices available for use by the user during the online meeting, each I/O device of the set being constructed and arranged to perform a same I/O function, the evaluation operation assessing online meeting performance of each I/O device of the set;
    selecting, by the processing circuitry, an I/O device of the set based on a result of the evaluation operation;
    after the I/O device is selected, performing, by the processing circuitry, a user interface operation to interface the user to the online meeting, the user interface operation one of:
        (i) involving the selected I/O device of the set in the online meeting and excluding a non-selected I/O device of the set from the online meeting to enable the user to participate in the online meeting via the selected I/O device of the set and not via the non-selected I/O device of the set, and
        (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set; and
    after a predefined amount of time has passed since the selected I/O device was selected, automatically re-evaluating the set of I/O devices during the online meeting, and automatically selecting a different I/O device in place of the selected I/O device in response to re-evaluation of the set of I/O devices.

2. A method as in claim 1 wherein performing the evaluation operation includes:
    evaluating the set of I/O devices based on a set of quality criteria to determine which I/O device of the set provides superior online meeting performance.

3. A method as in claim 2 wherein the set of I/O devices includes a first I/O device and a second I/O device; wherein evaluating the set of I/O devices includes:
    applying the set of quality criteria to determine that the first I/O device provides superior online meeting performance over the second I/O device when performing the same I/O function, and wherein selecting the I/O device of the set based on the result of the evaluation operation includes:
upon completion of the evaluation operation, choosing the first I/O device over the second I/O device based on application of the set of quality criteria.

4. A method as in claim 3 wherein the first I/O device is a first video camera; wherein the second I/O device is a second video camera; and wherein performing the user interface operation includes:
sharing a video signal from the first video camera with other participants of the online meeting while not sharing any video signal from the second video camera with the other participants of the online meeting.

5. A method as in claim 4 wherein applying the set of quality criteria to determine that the first I/O device provides superior online meeting performance over the second I/O device when performing the same I/O function includes:
ascertaining that the first video camera provides a larger facial view of the user than the second video camera, and
outputting, as the result of the evaluation operation, an indication that the first video camera provides the larger facial view of the user.

6. A method as in claim 4 wherein applying the set of quality criteria to determine that the first I/O device provides superior online meeting performance over the second I/O device when performing the same I/O function includes:
ascertaining that the first video camera is closer to a face of the user than the second video camera, and
outputting, as the result of the evaluation operation, an indication that the first video camera is closer to the face of the user.

7. A method as in claim 4 wherein applying the set of quality criteria to determine that the first I/O device provides superior online meeting performance over the second I/O device when performing the same I/O function includes:
comparing a signal to noise ratio provided by the first video camera with a signal to noise ratio provided by the second video camera, and
outputting, as the result of the evaluation operation, an indication that the first video camera provides a better signal to noise ratio.

8. A method as in claim 4 wherein applying the set of quality criteria to determine that the first I/O device provides superior online meeting performance over the second I/O device when performing the same I/O function includes:
comparing a video quality provided by the first video camera with a video quality provided by the second video camera, and
outputting, as the result of the evaluation operation, an indication that the first video camera provides a better video quality.

9. A method as in claim 4 wherein applying the set of quality criteria to determine that the first I/O device provides superior online meeting performance over the second I/O device when performing the same I/O function includes:
accessing a video camera database which ranks video cameras in a preferred video camera order, and
outputting, as the result of the evaluation operation, an indication that the first video camera is ranked higher than the second video camera in the video camera database.

10. A method as in claim 3 wherein the first I/O device is a first microphone; wherein the second I/O device is a second microphone; and wherein performing the user interface operation includes:
sharing an audio signal from the first microphone with other participants of the online meeting while not sharing any audio signal from the second microphone with the other participants of the online meeting.

11. A method as in claim 10 wherein applying the set of quality criteria to determine that the first I/O device provides superior online meeting performance over the second I/O device when performing the same I/O function includes:
generating a first audio quality score based on a first audio signal from the first microphone;
generating a second audio quality score based on a second audio signal from the second microphone; and
outputting, as the result of the evaluation operation, an indication that the first audio quality score is higher than the second audio quality score.

12. A method as in claim 10 wherein applying the set of quality criteria to determine that the first I/O device provides superior online meeting performance over the second I/O device when performing the same I/O function includes:
accessing a microphone database which ranks microphones in a preferred microphone order, and
outputting, as the result of the evaluation operation, an indication that the first microphone is ranked higher than the second microphone in the microphone database.

13. A method as in claim 10 wherein applying the set of quality criteria to determine that the first I/O device provides superior online meeting performance over the second I/O device when performing the same I/O function includes:
identifying that (i) the first microphone resides in a communications device and (ii) a speaker of the communications device is in operation to output audio of the online meeting, and
outputting, as the result of the evaluation operation, an indication that the first microphone is preferred over the second microphone for use in the online meeting to enable use of echo cancellation by the communications device.

14. A method of interfacing a user to an online meeting, the method comprising:
performing, by processing circuitry, an evaluation operation on a set of input/output (I/O) devices available for use by the user during the online meeting, each I/O device of the set being constructed and arranged to perform a same I/O function, the evaluation operation assessing online meeting performance of each I/O device of the set;
selecting, by the processing circuitry, an I/O device of the set based on a result of the evaluation operation; and
after the I/O device is selected, performing, by the processing circuitry, a user interface operation to interface the user to the online meeting, the user interface operation one of:
(i) involving the selected I/O device of the set in the online meeting and excluding a non-selected I/O device of the set from the online meeting to enable the user to participate in the online meeting via the selected I/O device of the set and not via the non-selected I/O device of the set, and
(ii) prompting the user to involve the selected I/O device of the set in the online meeting and exclude a non-selected I/O device of the set from the online meeting to enable the user to participate in the online meeting via the selected I/O device of the set and not via the non-selected I/O device of the set;

wherein performing the evaluation operation includes:
  evaluating the set of I/O devices based on a set of quality criteria to determine which I/O device of the set provides superior online meeting performance;
wherein the set of I/O devices includes a first I/O device and a second I/O device;
wherein evaluating the set of I/O devices includes:
  applying the set of quality criteria to determine that the first I/O device provides superior online meeting performance over the second I/O device when performing the same I/O function;
wherein selecting the I/O device of the set based on the result of the evaluation operation includes:
  upon completion of the evaluation operation, choosing the first I/O device over the second I/O device based on application of the set of quality criteria;
wherein the first I/O device is a first speaker;
wherein the second I/O device is a second speaker; and
wherein performing the user interface operation includes:
  outputting an audio signal of the online meeting from the first speaker while not outputting the audio signal of the online meeting from the second speaker.

15. A method of interfacing a user to an online meeting, the method comprising:
performing, by processing circuitry, an evaluation operation on a set of input/output (I/O) devices available for use by the user during the online meeting, each I/O device of the set being constructed and arranged to perform a same I/O function, the evaluation operation assessing online meeting performance of each I/O device of the set;
selecting, by the processing circuitry, an I/O device of the set based on a result of the evaluation operation;
after the I/O device is selected, performing, by the processing circuitry, a user interface operation to interface the user to the online meeting, the user interface operation one of:
  (i) involving the selected I/O device of the set in the online meeting and excluding a non-selected I/O device of the set from the online meeting to enable the user to participate in the online meeting via the selected I/O device of the set and not via the non-selected I/O device of the set, and
  (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set;
after involvement of the selected I/O device in the online meeting, discovering that a new I/O device has been added to the set of I/O devices; and
in response to discovery of the new I/O device, automatically re-evaluating the set of I/O devices during the online meeting, and automatically selecting a different I/O device in place of the selected I/O device in response to re-evaluation of the set of I/O devices.

16. A method as in claim 3 wherein involving the selected I/O device of the set in the online meeting and excluding a non-selected I/O device of the set from the online meeting includes:
  when a new I/O device is selected, automatically switching to the new I/O device and rendering a notification to the user indicating that the processing circuitry has switched to the new I/O device.

17. A method of interfacing a user to an online meeting, the method comprising:
performing, by processing circuitry, an evaluation operation on a set of input/output (I/O) devices available for use by the user during the online meeting, each I/O device of the set being constructed and arranged to perform a same I/O function, the evaluation operation assessing online meeting performance of each I/O device of the set;
selecting, by the processing circuitry, an I/O device of the set based on a result of the evaluation operation; and
after the I/O device is selected, performing, by the processing circuitry, a user interface operation to interface the user to the online meeting, the user interface operation one of:
  (i) involving the selected I/O device of the set in the online meeting and excluding a non-selected I/O device of the set from the online meeting to enable the user to participate in the online meeting via the selected I/O device of the set and not via the non-selected I/O device of the set, and
  (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set;
wherein performing the evaluation operation includes:
  evaluating the set of I/O devices based on a set of quality criteria to determine which I/O device of the set provides superior online meeting performance;
wherein the set of I/O devices includes a first I/O device and a second I/O device;
wherein evaluating the set of I/O devices includes:
  applying the set of quality criteria to determine that the first I/O device provides superior online meeting performance over the second I/O device when performing the same I/O function, and
wherein selecting the I/O device of the set based on the result of the evaluation operation includes:
  upon completion of the evaluation operation, choosing the first I/O device over the second I/O device based on application of the set of quality criteria; and
wherein prompting the user to involve the selected I/O device of the set in the online meeting and exclude a non-selected I/O device of the set from the online meeting includes:
  when a new I/O device is selected, rendering a visual prompt to the user which identifies the new I/O device as a best suited I/O device for the online meeting and prompts the user to switch to the new I/O device.

18. An electronic apparatus, comprising:
a communications interface to connect to an online meeting;
memory; and
control circuitry coupled to the communications interface and the memory, the memory storing instructions which, when carried out by the control circuitry, cause the control circuitry to:
  perform an evaluation operation on a set of input/output (I/O) devices available for use by a user during the online meeting, each I/O device of the set being constructed and arranged to perform a same I/O function, the evaluation operation assessing online meeting performance of each I/O device of the set,
  select an I/O device of the set based on a result of the evaluation operation, perform a user interface operation to interface the user to the online meeting, the user interface operation one of:
  (i) involving the selected I/O device of the set in the online meeting and excluding a non-selected I/O device of the set from the online meeting to enable the user to participate in the online meeting via the selected I/O device of the set and not via the non-selected I/O device of the set, and
  (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set; and
after a predefined amount of time has passed since the selected I/O device was selected, automatically re-evaluate the set of I/O devices during the online meeting, and automatically select a different I/O device in place of the selected I/O device in response to re-evaluation of the set of I/O devices.

19. A computer program product having a non-transitory computer readable medium which stores a set of instructions to interface a user to an online meeting, the set of instructions, when carried out by computerized circuitry, causing the computerized circuitry to perform a method of:
performing an evaluation operation on a set of input/output (I/O) devices available for use by the user during the online meeting, each I/O device of the set being constructed and arranged to perform a same I/O function, the evaluation operation assessing online meeting performance of each I/O device of the set;
selecting an I/O device of the set based on a result of the evaluation operation; and
after the I/O device is selected, performing a user interface operation to interface the user to the online meeting, the user interface operation one of:
  (i) involving the selected I/O device of the set in the online meeting and excluding a non-selected I/O device of the set from the online meeting to enable the user to participate in the online meeting via the selected I/O device of the set and not via the non-selected I/O device of the set, and
  (ii) prompting the user to involve the selected I/O device of the set in the online meeting and exclude a non-selected I/O device of the set from the online meeting to enable the user to participate in the online meeting via the selected I/O device of the set and not via the non-selected I/O device of the set; and
after a predefined amount of time has passed since the selected I/O device was selected, automatically re-evaluating the set of I/O devices during the online meeting, and automatically selecting a different I/O device in place of the selected I/O device in response to re-evaluation of the set of I/O devices.

20. A method as in claim 1 wherein performing the user interface operation includes:
interfacing the user to the online meeting using the selected I/O device, while other processing circuitry concurrently interfaces another user to the online meeting using another I/O device selected from another set of I/O devices based on a result of another evaluation operation assessing online meeting performance of each I/O device of the other set.

* * * * *